US009557176B2

(12) United States Patent
Servantie et al.

(10) Patent No.: US 9,557,176 B2
(45) Date of Patent: Jan. 31, 2017

(54) METHOD FOR SYNTHETIC THREE-DIMENSIONAL CONFORMAL REPRESENTATION OF TERRAIN CARTOGRAPHY AS A FUNCTION OF VISIBILITY

(71) Applicant: THALES, Neuilly sur Seine (FR)

(72) Inventors: Xavier Servantie, Pessac (FR); Siegfried Rouzes, Le Haillan (FR); Emmanuel Monvoisin, Bordeaux (FR)

(73) Assignee: Thales, Neuilly sur Seine (FR)

( * ) Notice: Subject to any disclaimer, the term of this patent is extended or adjusted under 35 U.S.C. 154(b) by 179 days.

(21) Appl. No.: 14/479,243

(22) Filed: Sep. 5, 2014

(65) Prior Publication Data

US 2015/0073696 A1 Mar. 12, 2015

(30) Foreign Application Priority Data

Sep. 6, 2013 (FR) ..................................... 13 02074

(51) Int. Cl.
G01C 21/20 (2006.01)
G06T 17/05 (2011.01)
G01C 23/00 (2006.01)

(52) U.S. Cl.
CPC .............. *G01C 21/20* (2013.01); *G01C 23/00* (2013.01); *G06T 17/05* (2013.01)

(58) Field of Classification Search
None
See application file for complete search history.

(56) References Cited

U.S. PATENT DOCUMENTS

| 7,098,913 | B1 | 8/2006 | Etherington et al. |
| 7,262,713 | B1 | 8/2007 | Vogl et al. |
| 7,825,831 | B2 * | 11/2010 | Naimer ................. G01C 23/00 340/970 |
| 8,049,644 | B1 | 11/2011 | Oehlert et al. |
| 8,185,301 | B1 * | 5/2012 | Simon .................. G01C 23/005 340/945 |

(Continued)

OTHER PUBLICATIONS

French Search Report for French Counterpart Application No. FR 1302074, 9 pgs. (Jun. 25, 2014).

(Continued)

*Primary Examiner* — Rami Khatib
(74) *Attorney, Agent, or Firm* — Blakely, Sokoloff, Taylor & Zafman LLP

(57) ABSTRACT

The general field of the invention is that of methods for three-dimensional conformal representation of a terrain. The method is used in a piloting and navigation assistance system of an aircraft. The assistance system comprises a navigation system, a cartographic database, electronic calculation means a meteorological database and a display system allowing the superimposition of synthetic images on the exterior. The method comprises the following steps: Step 1: Calculation, for a determined position of the vehicle, of the terrain perceptible through the display system; Step 2: Selection of a part of the said terrain as a function of a distance or of an altitude or of a range of altitudes; Step 3: Calculation of a three-dimensional conformal cartographic representation of the said selected part of the terrain; and Step 4: Display of the said cartographic representation by the display system.

5 Claims, 4 Drawing Sheets

(56) References Cited

U.S. PATENT DOCUMENTS

| | | | |
|---|---|---|---|
| 8,224,508 B2* | 7/2012 | Bacabara | G01C 21/00 701/16 |
| 8,232,910 B1* | 7/2012 | Burton | G01S 7/412 342/26 B |
| 8,264,498 B1 | 9/2012 | Vanderkamp et al. | |
| 8,279,108 B2* | 10/2012 | Nouvel | G01O 5/005 340/945 |
| 9,146,132 B2* | 9/2015 | He | G01C 23/00 |
| 2007/0171094 A1 | 7/2007 | Alter et al. | |

OTHER PUBLICATIONS

Peter J. Bennett, "Enhanced Navigation and Displays from Passive Terrain Referenced Avionics", Ferranti Defence Systems Limited, Edinburgh, Scotland, XP010076893, pp. 209-216, (May 23, 1988).

* cited by examiner

METHOD FOR SYNTHETIC THREE-DIMENSIONAL CONFORMAL REPRESENTATION OF TERRAIN CARTOGRAPHY AS A FUNCTION OF VISIBILITY

BACKGROUND OF THE INVENTION

1. Field of the Invention

The field of the invention is that of synthetic three-dimensional cartographic representation represented in a conformal manner. Conformal representation refers to a cartographic representation that is superimposed on the terrain actually seen by the observer. The optical superimposition is provided by an optical system that projects the synthetic image towards the observer's eye. This optical system comprises an optical mixer or combiner which provides the superimposition of the image on the external landscape. This type of representation is particularly used in aeronautics in order to ensure piloting in poor visibility or at night.

2. Description of the Prior Art

A cartographic representation system is shown in FIG. 1. This system comprises a database $B_D$ of data representing the terrain flown over, means $S_N$ making it possible to determine the position and the orientation of the optical system displaying the cartographic image, an image generator CE and the optical projection system D. The image generator CE provides three main functions which are: the calculation of the point of view, the selection of the area of terrain to be displayed and the calculation of the image to be displayed as a function of the point of view.

One of the difficult points of this three-dimensional representation is that it must be sufficiently complete and accurate to give a good representation of the terrain flown over which can be useful for piloting and for navigation and sufficiently unobtrusive not to saturate the natural image of the landscape.

Various systems have been proposed. By way of example, the patents U.S. Pat. No. 8,264,498 entitled "System, apparatus, and method for presenting a monochrome image of terrain on a head-up display unit" and U.S. Pat. No. 7,098,913 entitled "Method and system for providing depth cues by attenuating distant displayed terrain" propose diverse approaches to this representation. A conventional approach consists in representing the terrain flown over in the form of a simple grid C as shown in FIG. 2 where the grid is shown in white lines on a black background. The perception of distance is produced solely by the size of the geometric elements of the grid which are delimited by the white lines in FIG. 2. In fact, under the effect of perspective, the longer the distance is from the displayed point of view, the smaller are the geometric elements on the screen. As seen in FIG. 2, this type of display naturally tends to saturate the parts most distant from the observer with lines whereas, in certain meteorological conditions, the distant parts of the terrain can be perfectly identifiable by the observer, notably in clear weather.

SUMMARY OF THE INVENTION

The cartographic representation method according to the invention does not exhibit these disadvantages. In fact, it makes it possible to display a cartographic representation only where it is necessary, that is to say in the areas of reduced visibility, under or above clouds.

More precisely, the invention relates to a method for synthetic three-dimensional conformal representation of a terrain, the said method being used in a piloting and navigation assistance system of an aircraft, the said assistance system comprising at least a navigation system, a cartographic database, electronic calculation means and a display system allowing the superimposition of synthetic images on the exterior, characterized in that the said method comprises the following steps:

Step 1: Calculation, for a determined position of the vehicle, of the terrain perceptible through the display system;

Step 2: Selection of a part of the said terrain as a function of a distance or of an altitude or of a range of altitudes;

Step 3: Calculation of a three-dimensional conformal cartographic representation of the said selected part of the terrain;

Step 4: Display of the said cartographic representation by the display system.

Advantageously, the conformal cartographic representation is calculated for a part of the terrain situated below a maximum altitude or above a minimum altitude.

Advantageously, the conformal cartographic representation is calculated for a part of the terrain situated beyond a minimum distance.

Advantageously, the assistance system comprises a meteorological database comprising at least the altitudes of the bottom and of the top of the cloud layer, if it exists, above the terrain perceptible through the display system, the conformal cartographic representation being calculated for the hidden part of the terrain situated between the bottom and the top of the cloud layer.

Advantageously, the conformal cartographic representation is a grid composed of lines of levels in two perpendicular directions.

The invention also relates to a system for assisting the piloting and navigation of an aircraft comprising at least a navigation system, a cartographic database, a display system allowing the superimposition of synthetic images on the exterior seen from the vehicle and electronic calculation means configured in such a way as to use the method described above for synthetic three-dimensional conformal representation of a terrain.

BRIEF DESCRIPTION OF THE DRAWINGS

The invention will be better understood and other advantages will become apparent on reading the following description given in a non-limiting way and referring to the appended figures among which.

DETAILED DESCRIPTION

Figure 1:
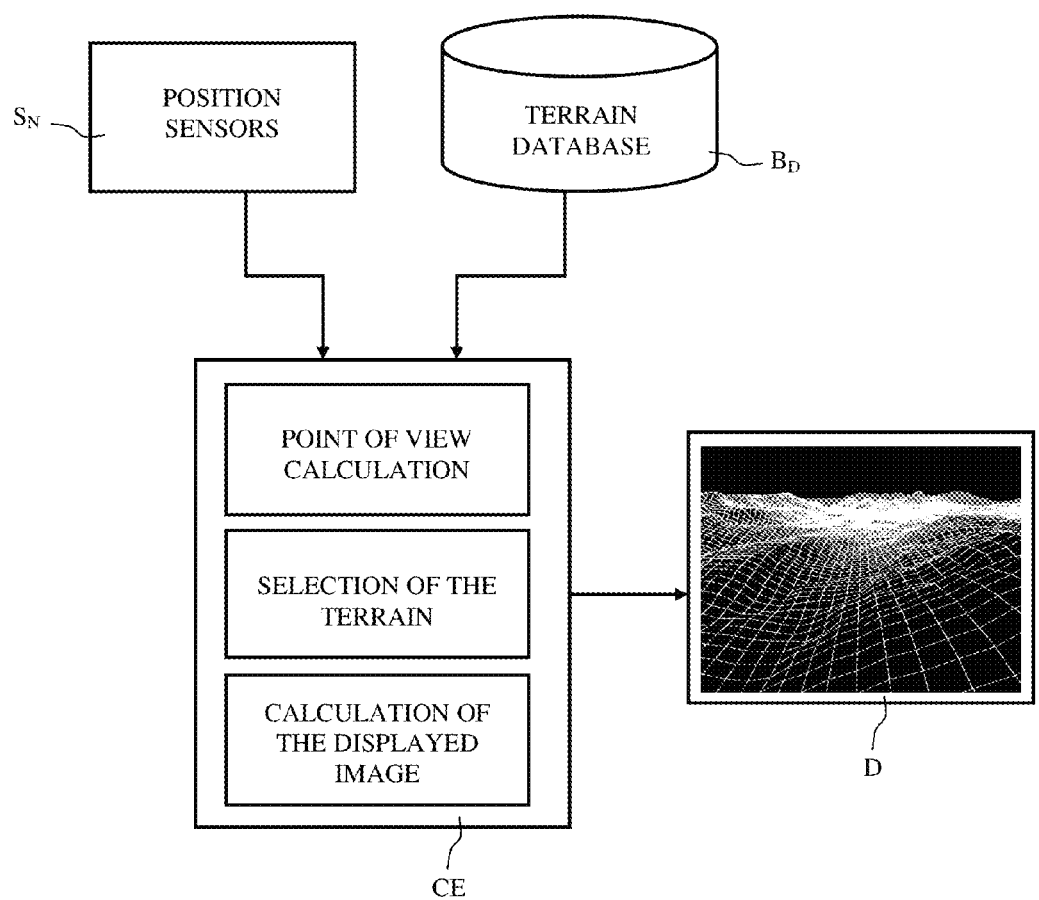
FIG. 1 is a block diagram of a piloting and navigation aid system according to the prior art.
Figure 2:
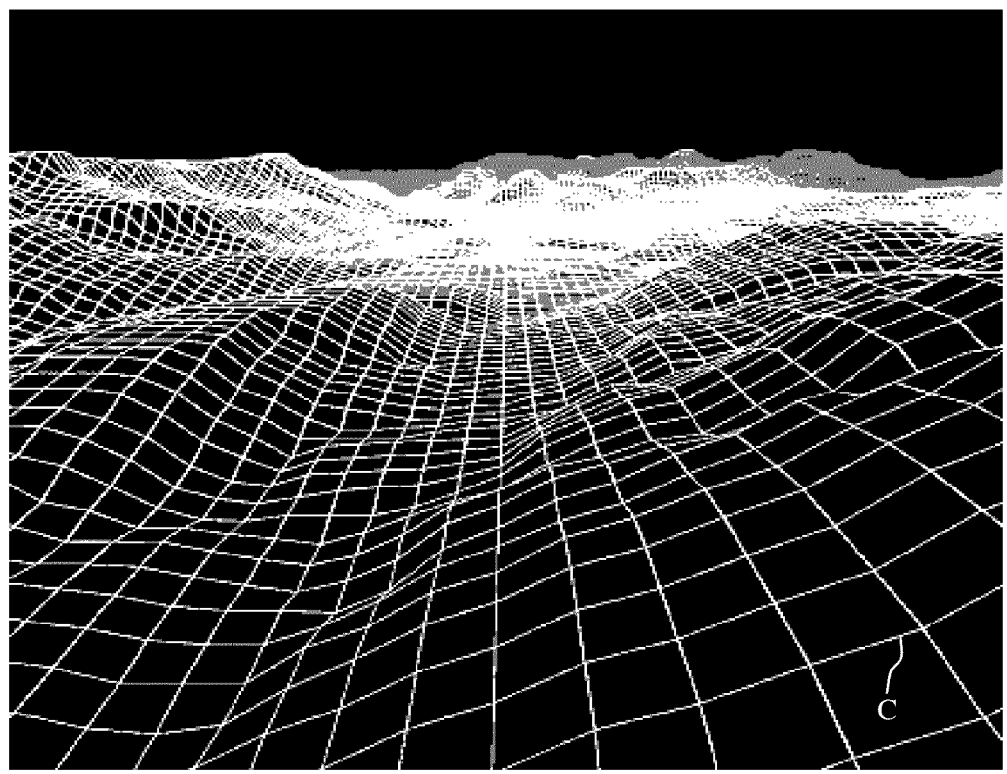
FIG. 2 shows a conformal cartographic representation in the form of a grid according to the prior art.
Figure 3:
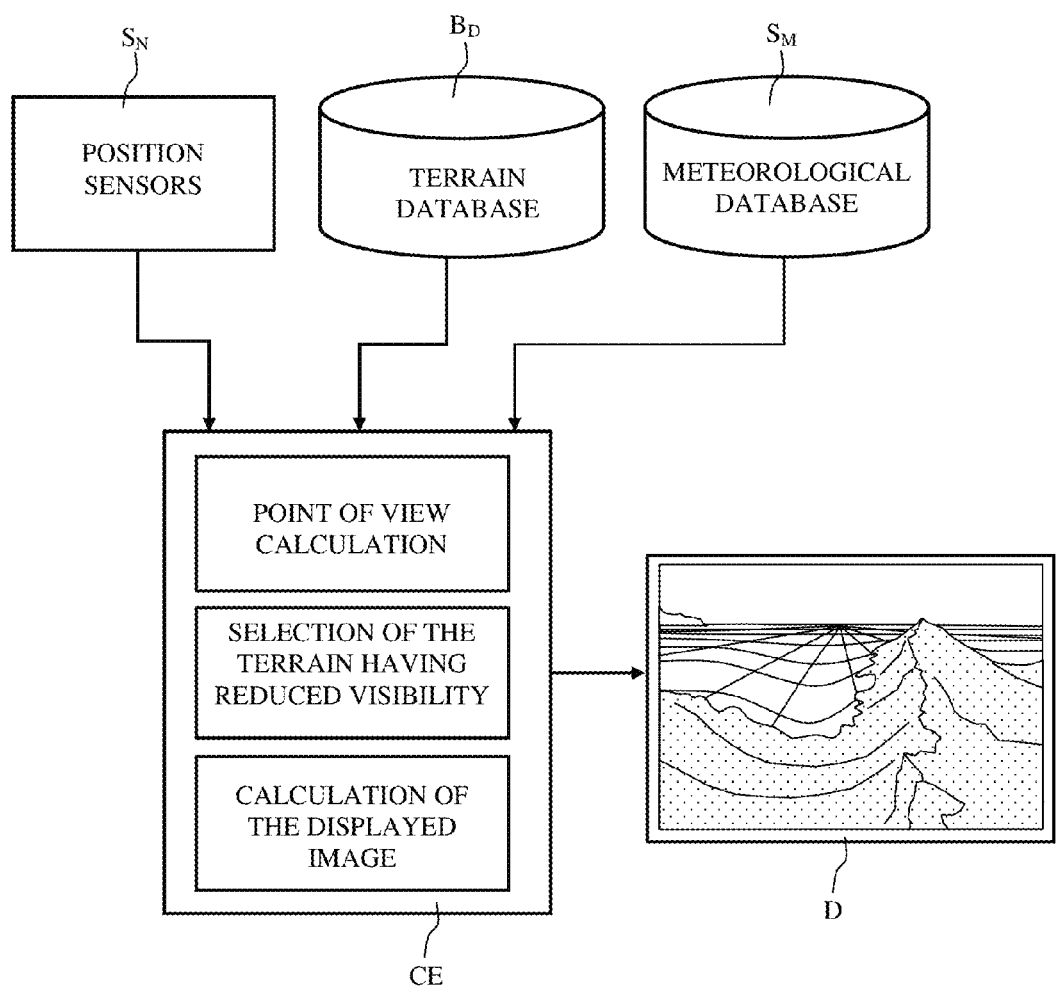
FIG. 3 shows the block diagram of a piloting and navigation aid system according to the invention.

In order to be used, the graphical representation method according to the invention requires a system for assisting the piloting and navigation of a vehicle. In its main application, the method is used in an aircraft so as to provide the pilot with the best possible representation of the external landscape. The piloting assistance system is the avionic system installed in the aircraft. Such systems now exist in all modern aircraft and are known to those skilled in the art. They are also known by the acronym "SVS", signifying "Synthetic Vision System". Such a system is shown in FIG. 3. It comprises art least:

A navigation system $S_N$ making it possible to determine the position and the altitude of the aircraft. By way of example, these navigation systems comprise inertial systems and/or systems of the GPS (an acronym signifying "Global Positioning System") type;

A cartographic database $B_C$ of the terrain flown over;

An electronic calculator CE making it possible to carry out, among other things, data processing and graphical representation calculations and using the display method according to the invention;

A display system D preferably comprising a display device of the so-called "See-Through Displays" type. These displays can be transparent screens displaying the cartographic representation such as liquid crystal screens or "Head-Up" sights, also called "Head-Up Displays", which project a collimated image of the cartographic representation;

A meteorological data system $S_M$, the data being supplied to it by the meteorological radar of the aircraft or by meteorological stations on the ground.

The method according to the invention comprises the following steps:

Step 1: Calculation, for a determined position of the aircraft, of the terrain perceptible through the display system;

Step 2: Selection of a part of the said terrain as a function of a distance or of an altitude or of a range of altitudes;

Step 3: Calculation of a three-dimensional conformal cartographic representation of the said selected part of the terrain;

Step 4: Display of the said cartographic representation by the display system.

Step 2 is the new and important step of the method according to the invention. The selection of the terrain over which a conformal cartographic representation is displayed is carried out essentially on the basis of a criterion of visibility of the terrain. The cartographic representation is displayed where the terrain is hardly visible or is completely masked.

In a first selection mode, the terrain situated beyond the visibility distance is selected. This visibility distance can be determined automatically on the basis of meteorological data and from flight conditions. It can be chosen by the pilot.

In a second selection mode, the computer determines the thickness of the cloud layer on the basis of meteorological data. This cloud layer has a minimum altitude BN which can correspond to the surface of the terrain and a maximum altitude HN. The aircraft can be below the cloud layer. In this case, the selected terrain is situated above the minimum altitude BN. The aircraft can be in the cloud layer. In this case, the whole of the terrain is selected. The aircraft can be above the cloud layer. In the latter case, the selected terrain is below a maximum altitude HN.

In a third selection mode, the selection of the terrain is carried out automatically by the computer on the basis of meteorological data.

Once the selection of the terrain has been carried out, the computer calculates a three-dimensional conformal cartographic representation of the said selected part of the terrain.

By way of example, this representation is a grid, the terrain being represented in the form of a projection of regular squares which closely follow the shape of the terrain. There are numerous variants of this first representation, such as the representation of ridge lines.

Figure 4:
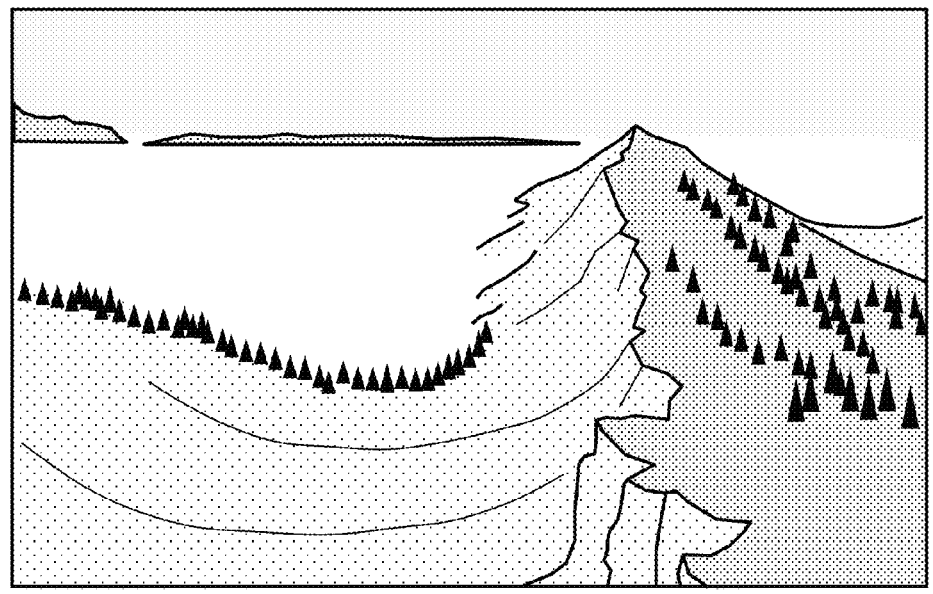
FIG. 4 shows a landscape without cartographic representation.
Figure 5:
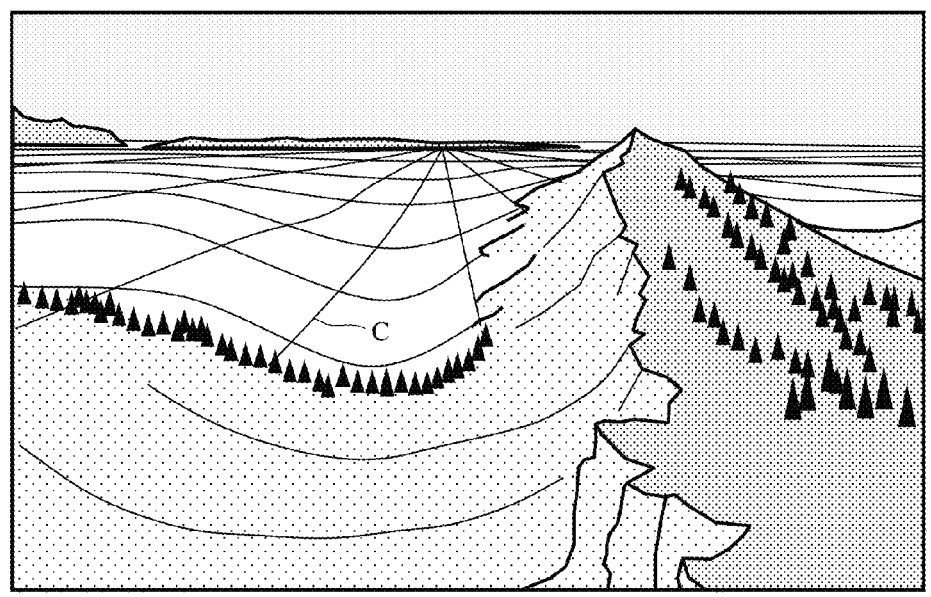
FIG. 5 shows a conformal cartographic representation in the form of a grid according to the invention applied to the preceding landscape.

FIGS. 4 and 5 give an illustration of the method according to the invention. They show, with the inherent limitations of the patent figures, a landscape seen through the semi-transparent screen of a display system. A mountain can be seen in the foreground on the right hand side of FIG. 4 and a cloud layer that masks all of the rear of the landscape. The mountain is represented by dotted lines and the cloud layer is represented in white in FIG. 4. The aircraft is situated above the cloud layer and the part of the terrain situated below the cloud layer is invisible. The meteorological data make it possible to know the maximum altitude of that cloud layer. In this case, the computer calculates the cartographic representation of the terrain masked by the cloud layer is displays it on the screen.

In the case of FIG. 5, this display is carried out in the form of a grid shown in black lines on the white background of the cloud layer. In the real image, the grid is shown in bright coloured lines, generally monochromatic. The brightness of the lines is chosen to be sufficient for the grid to be clearly visible on the background of the clouds.

The pilot can thus appreciate the elements of the terrain hidden by the cloud layer without uselessly overloading the clearly visible elements in the foreground.

What is claimed is:

1. A method for synthetic three-dimensional representation of a terrain, said method being used in a piloting and navigation assistance system of an aircraft, said assistance system comprising at least a navigation system, a meteorological database comprising at least altitudes of a bottom and of a top of a cloud layer, a cartographic database, an electronic calculator, and a display system allowing superimposition of synthetic images on terrain perceptible through the display system, wherein said method comprises:

calculation, for a determined position of the aircraft, of the terrain perceptible through the display system;

selection of a hidden part of the perceptible terrain situated between the bottom and the top of the cloud layer;

calculation of a three-dimensional cartographic representation of the selected part of the terrain; and display of the said cartographic representation by the display system.

2. The method for representation of the terrain according to claim 1, wherein the cartographic representation is calculated for a part of the terrain situated at least one of below a maximum altitude and above a minimum altitude.

3. The method for representation of the terrain according to claim 1, wherein the cartographic representation is calculated for a part of the terrain situated beyond a minimum distance.

4. The method for representation of the terrain according to claim 1, wherein the cartographic representation is a grid comprised of lines of levels in two perpendicular directions.

5. A system for assisting the piloting and navigation of an aircraft, said system comprising at least a navigation system, a meteorological database comprising at least altitudes of a bottom and of a top of a cloud layer, a cartographic database and a display system allowing superimposition of synthetic images on terrain perceptible through the display system, wherein said system comprises an electronic calculator configured in such a way as to use a method for synthetic three-dimensional representation comprising:

calculation, for a determined position of the aircraft, of the terrain perceptible through the display system;

selection of a hidden part of the perceptible terrain situated between the bottom and the top of the cloud layer;

calculation of a three-dimensional cartographic representation of said selected part of the terrain; and display of said cartographic representation by the display system.

* * * * *